United States Patent [19]

Dowden

[11] Patent Number: 5,394,976
[45] Date of Patent: Mar. 7, 1995

[54] BARREL RECLAIMERS

[75] Inventor: Paul J. Dowden, Bristol, England

[73] Assignee: Strachan & Henshaw Limited, Bristol, England

[21] Appl. No.: 164,447

[22] Filed: Dec. 9, 1993

[30] Foreign Application Priority Data

Dec. 11, 1992 [GB] United Kingdom ............... 9225865

[51] Int. Cl.⁶ ............................................. B65G 65/16
[52] U.S. Cl. ...................................... 198/518; 198/509
[58] Field of Search ...................... 198/307.1, 509, 518, 198/711; 37/91, 94, 190

[56] References Cited

U.S. PATENT DOCUMENTS

| | | | |
|---|---|---|---|
| 2,647,332 | 8/1953 | Chimani | 198/518 X |
| 3,612,246 | 10/1971 | Elze et al. | 198/509 |
| 4,065,062 | 12/1977 | Heslop | 198/518 X |
| 4,106,226 | 8/1978 | Hanson | 37/190 |
| 4,392,566 | 7/1983 | Tschantz | 198/509 |
| 4,518,498 | 5/1985 | Monteyne | 198/509 X |
| 4,549,648 | 10/1985 | Langner | 198/509 |
| 4,613,035 | 9/1986 | Eisenkolb et al. | 198/509 |

FOREIGN PATENT DOCUMENTS

| | | | |
|---|---|---|---|
| 1229911 | 12/1966 | Germany | 198/509 |
| 1107818 | 3/1968 | United Kingdom . | |
| 1220326 | 1/1971 | United Kingdom . | |
| 1326340 | 8/1973 | United Kingdom . | |

OTHER PUBLICATIONS

Brochure "Stockpile Blending of Raw Materials", Strachan & Henshaw, Bristol, England.

Primary Examiner—James R. Bidwell
Attorney, Agent, or Firm—Jones, Tullar & Cooper

[57] ABSTRACT

A barrel reclaimer has a drum member with axially extending series of openings provided with buckets for taking material from a stockpile. At least some of the series of openings terminate spaced from the end of the drum member and auxiliary tapered openings are arranged in line with each such series, between the end of the associated series and the drum end. The provision of auxiliary openings of the forms discussed is found to increase the fatigue resistance of the drum member. It is also helpful if the individual openings of each axial series are uniformly spaced from each other.

8 Claims, 2 Drawing Sheets

BARREL RECLAIMERS

BACKGROUND OF THE INVENTION

This invention relates to barrel reclaimers for bulk materials, and in particular to the drums of such reclaimers.

Known barrel reclaimers comprise an elongate cylindrical drum rotatably mounted at its opposite ends on support frames which run on rails at the sides of a bulk material stockpile. Openings in the drum have scoop buckets projecting from them to pick up material from the stockpile as the drum is rotated and progressed along the rails into the stockpile. The material picked up by the buckets is deposited on a conveyor which extends axially through the interior of the drum and which delivers the material to a fixed conveyor at the side of the reclaimer track for further transport.

Because it is supported only at its ends, the drum of a barrel reclaimer is subject to beam loading and as it rotates the structure of the drum is therefore subjected to cyclic fluctuating loads. Despite the precautions that have been taken in the design of such equipment the problem remains that barrel reclaimer drums are prone to fatigue cracking after a relatively short operating life, in particular because of the higher local stresses occurring at the bucket openings. Despite taking such known measures such as the rounding of the corners of the openings, this problem remains a critical feature of the design of barrel reclaimer drums and there has been no satisfactory solution to it.

SUMMARY OF THE INVENTION

We have now found that the fatigue resistance of a barrel reclaimer drum provided with axial series of openings for admitting material into the drum, can be significantly increased by arranging that auxiliary openings of tapered form are provided at the ends of the series of openings.

According to one aspect of the invention therefore, a drum member for a barrel reclaimer comprises a plurality of series of openings provided with projecting bucket means for gathering bulk materials, each said series of openings being arranged in a row extending axially along the drum, at least one of said series of openings being disposed at a spacing from at least one end of the drum, an auxiliary opening being provided in line with and at the or each end of said series of openings so spaced from a drum end, the or each said auxiliary opening having a width which tapers with increasing distance from its associated series of openings.

It is also found to be an advantage if each axial series of openings has its individual openings substantially uniformly axially spaced from each other.

Preferably, the tapered sides of the or each auxiliary opening are substantially coincident with lines which are tangential to the adjacent end opening of the associated series of openings. It is also preferred to provide the or each auxiliary opening with a rounded end remote from its associated series of openings and to have the width of said auxiliary opening immediately preceding said rounded end not substantially more than half the width of the openings of the associated series of openings.

An embodiment of the invention will be described by way of example with reference to the accompanying drawings.

DESCRIPTION OF THE PREFERRED EMBODIMENT

Figure 4:
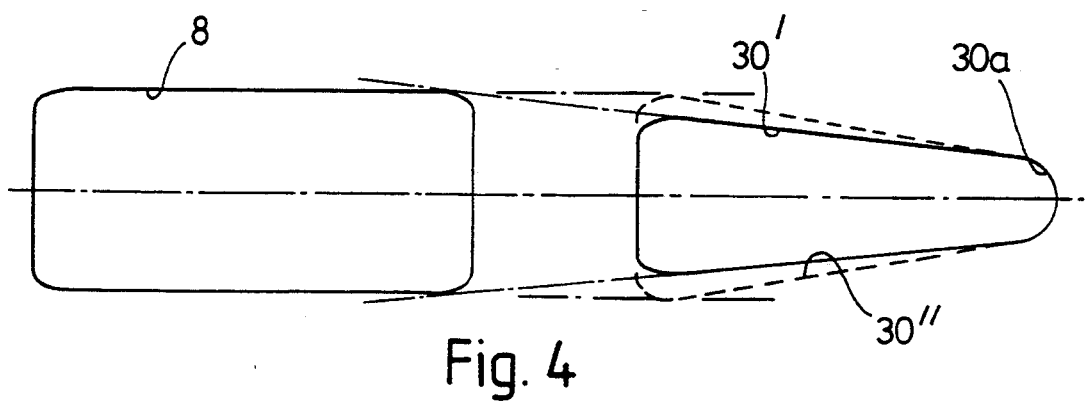
FIG. 4 is a detail of the drum of FIGS. 1 to 3 showing an end opening of a series of bucket openings and an adjacent auxiliary opening.

The illustrated barrel reclaimer drum 2 has a welded steel structure comprising a cylindrical shell 4, the plate from which the shell is constructed having a greater thickness in the central region of the drum to counter the increased bending loads there. The shell is reinforced by box-section stiffening rings 6 at intervals along its interior wall. A number of axial series of openings 8 (FIG. 4) pierce the shell between the stiffening rings 6 and scoop buckets 10 are provided at these openings for picking up bulk material as the drum rotates into a stockpile and depositing the material on a conveyor C running axially through the drum.

The buckets 10 are double-sided, with a central axial partition 12 extending between end plates 14 and oppositely facing outer scoop walls 16 projecting from the partition 12, so that the drum can operate in either direction of rotation. It is of course possible to provide single-sided buckets if the reclaimer is to operate in only one direction of rotation. The buckets include guide spigots 18 which extend through the openings 8 to carry the material they collect into the interior of the drum, and retaining members 20 which hold the material in the spigots until they reach positions over the internal axial conveyor.

Figure 1:
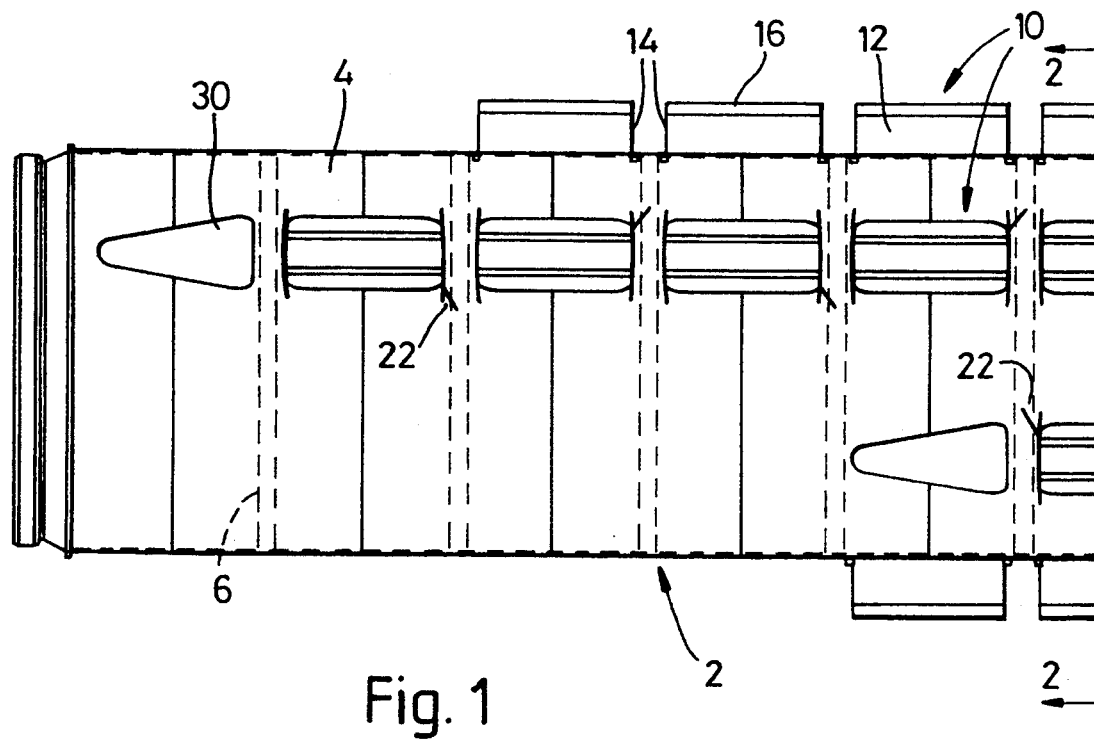
FIG. 1 is a side elevation of a part of the length of a barrel reclaimer drum according to the invention.
Figure 2:
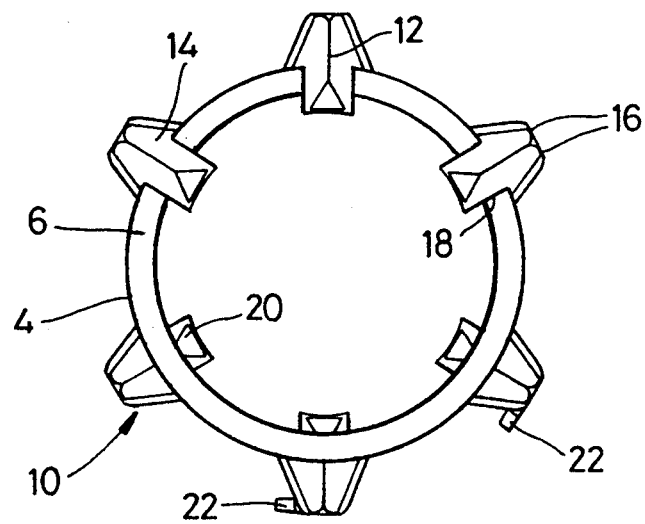
FIG. 2 is a transverse section of the drum in FIG. 1.
Figure 3:
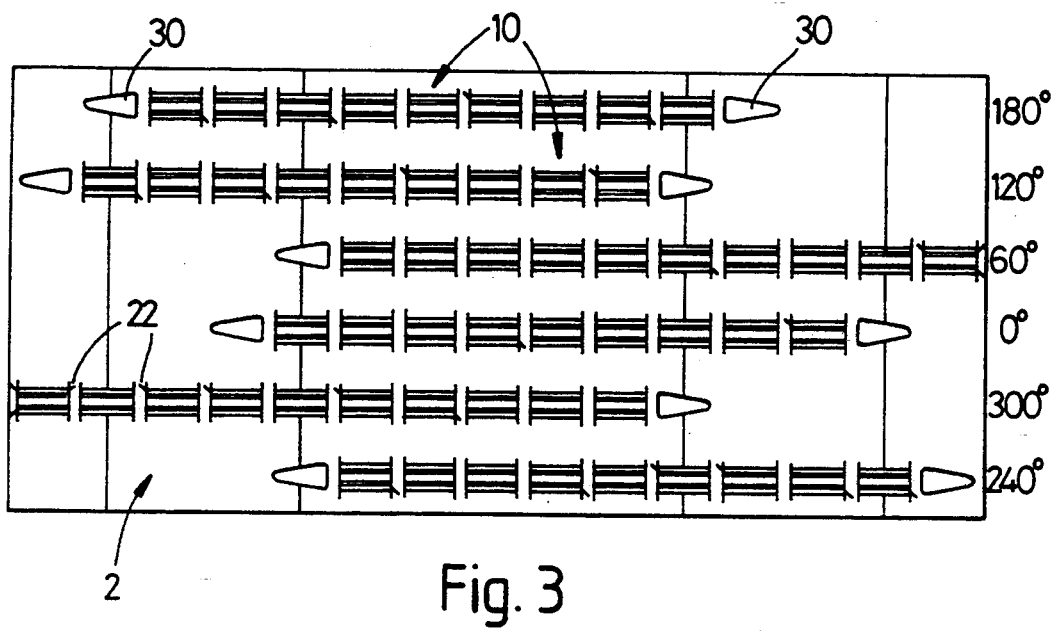
FIG. 3 is a planar development drawing showing the arrangement of scoop buckets and openings on the drum of FIGS. 1 and 2.

As FIG. 3 shows, the buckets 10, and their openings 8, are arranged in a number of axial series at equal angular intervals around the periphery of the drum. The openings of the several series are axially aligned in circumferential rows but they are so arranged that the openings are concentrated towards the middle of the drum. Thus, the five central circumferential rows have six openings at equal angular intervals and the number of openings in each row then decreases towards the drum ends, there being only one opening at each end circumferential position. This non-uniform distribution of the buckets reflects the fact that the stockpile will be heaped towards the centre, so that a greater proportion of the material being reclaimed must be picked up by the central portion of the drum as compared with its end portions.

It is a feature of the illustrated construction that the non-uniform axial distribution of the buckets is obtained while arranging the buckets at each angular position in an unbroken, uniformly spaced, axial series.

The bucket or buckets of each circumferential row carry a pair of oppositely inclined plough blades 22, these operating to displace material from the spaces between the buckets, and the margins at the ends of the drum, into the paths of the buckets.

In addition to the bucket openings 8 themselves, the drum has auxiliary openings 30 at the ends of each series of bucket openings where these series do not extend to the end of the drum. The auxiliary openings 30, which are given a tapered form narrowing with distance away from their associated series of openings 8, or tapering inwardly are not provided with buckets in this instance and are not intended to assist the material reclaiming operation. They are provided because it has been found that they have a significant effect on the pattern of stress in the drum shell and are able to give a considerable improvement in resistance to fatigue failure.

In the preferred form illustrated, the spacing of the auxiliary openings 30 from their adjacent bucket openings 8 is substantially the same as the spacing between the bucket openings themselves and reinforcing rings 6 are similarly located between the openings 8 and 30. The taper of the sides of each auxiliary opening is chosen within a range of angles at one limit of which straight-line projections of the side edges of the opening lie substantially tangential to the adjacent bucket opening (the side edges shown in full lines 30') and at the opposite limit of which straight-line projections of the adjacent bucket opening side edges are substantially tangential to the ends of the auxiliary opening side edges (shown in broken-lines 30").

The remote end 30a of each auxiliary opening is generally circular and the width of the opening immediately preceding the rounded end is less than half of the width of the bucket opening. The length of the auxiliary opening 30 need be no greater than that of the bucket openings 8 and it is a little smaller than the length of the opening 8 in the illustrated example.

The form of the bucket openings 8 shown in the drawings is typical of conventional bucket openings. Despite the generous rounding of the corners of these openings, it has had to be accepted in the past that the openings form starting points for fatigue cracks which can develop after a relatively short period of operation. Surprisingly, it is found that the provision of the auxiliary openings can improve performance in this respect and provide a considerable increase in the fatigue life of a barrel reclaimer drum.

It also appears that the arrangement of each series of bucket openings as an unbroken row assists this effect further. The latter feature contrasts with previous practice in which there are gaps in some of the axial series of bucket openings in order to arrange the buckets of each circumferential row at a relatively uniform angular spacing. With the arrangement illustrated, at some axial stations there will be a non-uniform angular spacing of the bucket openings but this does not have any significant effect on the performance of the equipment because it is unnecessary for the reclaimer to operate with drum buckets penetrating so deeply into the stockpile that they create thereby major variations of loading on the individual buckets.

Figure 5:
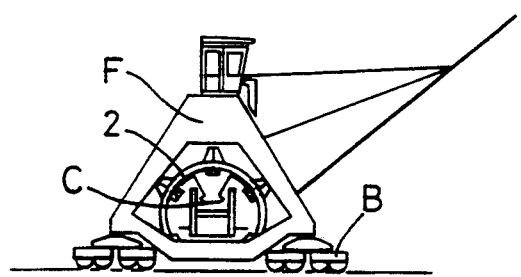
FIG. 5 is an end view of a barrel reclaimer comprising the drum of the preceding figures.

FIG. 5 illustrates a barrel reclaimer in which the drum 2 of the preceding figures is mounted in a support frame F. The drive means for rotating the drum in the frame is not shown because it can be entirely conventional. The frame F is provided with wheeled bogies B, also in a conventional manner, to drive the reclaimer along a stockpile.

I claim:

1. A drum member for a barrel reclaimer, said drum member comprising a cylindrical wall and a plurality of series of openings in said wall, each said series of openings being arranged in a row extending longitudinally of the drum, bucket means projecting outwardly of said wall at each said opening for gathering bulk materials, at least one of said series of openings being disposed at a spacing from at least one end of the drum, an auxiliary opening being located in line with said at least one series of openings between the end of said series of openings and said at least one end of the drum, the or each said auxiliary opening having opposed sides defining a width of the opening which tapers inwardly with increasing distance from its associated series of openings.

2. A drum member according to claim 1 wherein each axial series of openings has its individual openings substantially uniformly axially spaced from each other.

3. A drum member according to claim 2 wherein each auxiliary opening is similarly spaced from the end opening of the associated series of openings adjacent to it.

4. A drum member according to claim 1 wherein said opposed sides of the or each auxiliary opening are mutually inclined within a range having one limit at which straight-line projections of the opposed sides are substantially tangential to the adjacent end opening of the associated series of openings, and an opposite limit at which an adjacent end opening of the associated series of openings has opposed sides from which straight-line projections extend substantially tangentially to the nearer ends of said opposed sides of the auxiliary opening.

5. A drum member according to claim 1, wherein the or each auxiliary opening has a rounded end remote from its associated series of openings.

6. A drum member according to claim 1, wherein the or each tapered auxiliary opening has a narrower end with a width which is not substantially more than half the width of the openings of the associated series of openings.

7. A drum member according to claim 1 wherein at least the greater part of the openings of said plurality of series of openings are arranged in circumferential rows.

8. A barrel reclaimer comprising a drum member according to claim 1.

* * * * *